United States Patent [19]

Zlotek

[11] Patent Number: 4,621,720

[45] Date of Patent: Nov. 11, 1986

[54] DUAL START DRIVE SYSTEM

[75] Inventor: Thaddeus F. Zlotek, Center Line, Mich.

[73] Assignee: Dana Corporation, Toledo, Ohio

[21] Appl. No.: 813,538

[22] Filed: Dec. 26, 1985

[51] Int. Cl.[4] .............................................. F16D 41/04
[52] U.S. Cl. ................................ 192/48.92; 192/48.7; 74/7 C
[58] Field of Search ................... 192/48.92, 48.4, 48.6, 192/48.7, 48.8, 48.9, 42, 48.5; 74/665 A, 665 D, 7 C

[56] References Cited

U.S. PATENT DOCUMENTS

| | | | |
|---|---|---|---|
| 2,077,253 | 4/1937 | Nardone | 192/48 |
| 2,721,482 | 10/1955 | Shank et al. | 192/48.6 X |
| 2,762,479 | 9/1956 | Ullery | 192/45 |
| 2,834,445 | 5/1958 | Gorsky | 192/45.1 |
| 2,951,570 | 9/1960 | Antrim, Jr. et al. | 192/101 |
| 3,251,442 | 5/1966 | Aschauer | 192/48.3 |
| 3,300,004 | 1/1967 | Peterson | 192/48.7 |
| 3,369,638 | 2/1968 | Hunt et al. | 192/48.92 X |
| 4,106,605 | 8/1978 | Winchell | 192/48.4 X |
| 4,261,452 | 4/1981 | Barrows | 192/42 |
| 4,305,002 | 12/1981 | Mortensen | 290/38 R |
| 4,418,289 | 11/1983 | Mortensen | 307/142 |

*Primary Examiner*—Carl D. Friedman
*Attorney, Agent, or Firm*—Harold D. Shall

[57] ABSTRACT

A two speed drive system for rotatable devices having large moments of inertia. The drive system has two input driving members each of which is adapted to be driven as an input drive member. One of said members being a first speed driving member an the other of said members being a second speed driving member. The two driving members are coaxial with respect to each other and carry inner races for respective one-way over-running input clutches. An output drive member is also disposed coaxially with respect to the input drive members and carries an inner race for a one-way over-running clutch. A cylindrical outer race is disposed about the inner races of the first input drive member, the second input drive member and the output drive member. One-way drive means are disposed between the respective inner and outer races to complete the clutches. The first and second speed drive member drive from the inner to the outer races while the output drive member drives from the outer to the inner race.

11 Claims, 2 Drawing Figures

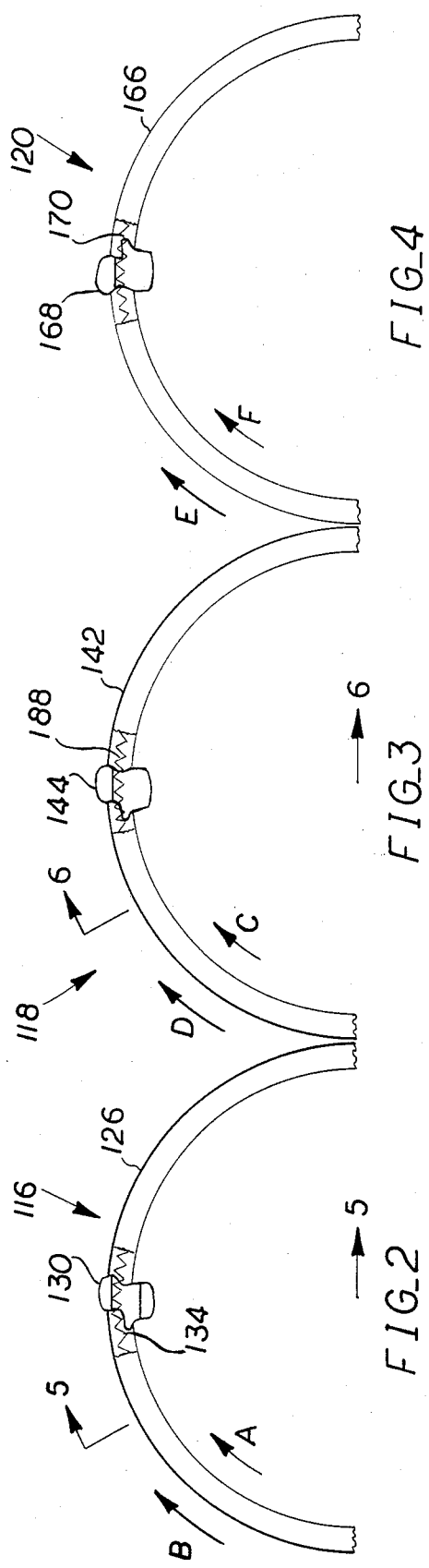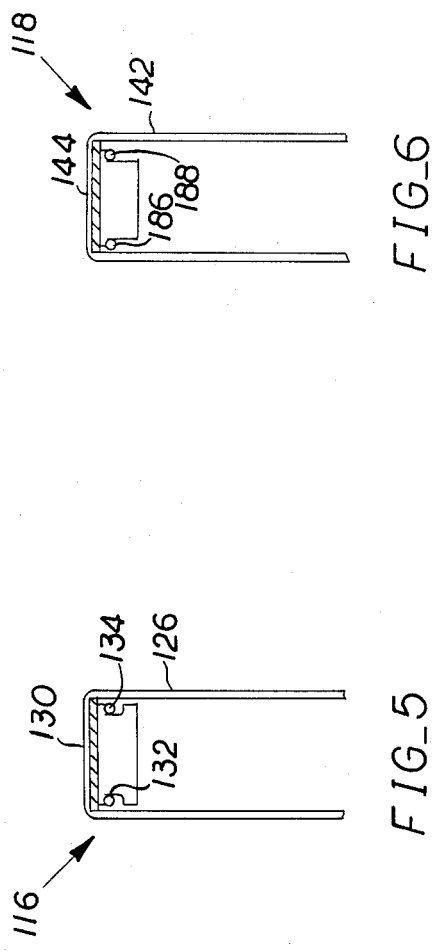

4,621,720

DUAL START DRIVE SYSTEM

BACKGROUND OF THE INVENTION

1. Field of the Invention

This invention relates to starter drives generally, and more particularly to a dual start drive system for starting rotatable devices having large moments of inertia which must be overcome to bring them to operating speed such as gas turbines, electric rotors and the like.

2. Description of Prior Art

One way over-running clutches of the sprag type are well known in the prior art and have been used in starting mechanisms. It's also well known to provide several clutches in an operating mechanism which can be disengaged upon achieving a predetermined condition.

U.S. Pat. Nos. 2,077,253, to Nardone 3,251,442 to Aschauer, 4,305,002 to Mortensen and 4,418,289 to Mortensen all disclose two-state clutching mechanisms. However, none of these patents disclose the structure of the present invention including the co-axial arrangement of the two drive members and the output drive member of the starting device with the three members having inner race portions thereof disposed within a single outer race.

SUMMARY OF THE INVENTION

Applicant avoids the shortcomings and complications of the prior art by providing a first high torque-low speed starter member disposed co-axially with second lower torque higher speed starter member and with the first and second starter members being co-axial with an output drive member. The three members each has an inner race of a sprag clutch drivingly carried thereon with the three inner races being disposed co-axially with and within a single outer race. Conventional sprags of sprag clutches are disposed between the inner races and the outer race.

In operation, the sprag clutch of the first drive member is initially clutched to the outer race while the latter is clutched to the output shaft to increase the speed of the output member from zero to some low output speed, such as about 100 r.p.m.; during which time the second input shaft is stationary and its sprag clutch is being overrun and is not operative to drive the output shaft. Once the output shaft has reached the first starting speed, the first input shaft driving source is stopped and the second input shaft driving source is started. The second input drive member becomes connected to the outer race and drives the output shaft to its operating speed; such as about 3600 r.p.m. While the second input shaft is driving the outer race, it overruns the sprag clutch of the first drive member; which preferably is of the well known type referred to as a centrifugal throw-out sprag clutch having the sprags and their retainer formed such that at some predetermined over-running speed, of about 300 r.p.m., (with the outer race over-running) the sprags lift off the inner race and there is no rubbing contact of the sprags.

When the started device has reached its starting speed, the second speed drive is also shut-off and returns to zero r.p.m. This allows the outer race to return to zero, since both the first and second speed drives are shut off, and the output shaft from the starter member over-runs the outer race which now becomes stationary. Oil supplied between the sprag cams of the output sprags and the inner race on the output shaft provides a hydrodynamic film to preserve the sprag cams for longer service life.

BRIEF DESCRIPTION OF THE DRAWINGS

For a fuller understanding of the nature and objects of the invention, reference should be made to the following detailed description, taken in conjunction with the accompanying drawings, in which:

FIG. 2 is a view taken along the lines 2—2 in FIG. 1, showing the cage of the first speed sprag clutch; with the cage being broken away to show one sprag and a portion of the retainer spring; the remaining sprags being omitted;

FIG. 3 is a view like FIG. 2, taken along the lines 3—3 in FIG. 1, showing the second speed sprag clutch;

FIG. 4 is a view like FIG. 2, taken along the lines 4—4 in FIG. 1, showing the output sprag clutch;

FIG. 5 is a cross sectional view taken along the lines 5—5 in FIG. 2 showing the sprag at that location; and FIG. 6 is a cross sectional view taken along the lines 6—6 in FIG. 3 showing the sprag at that location.

DETAILED DESCRIPTION OF A PREFERRED EMBODIMENT

Figure 1:
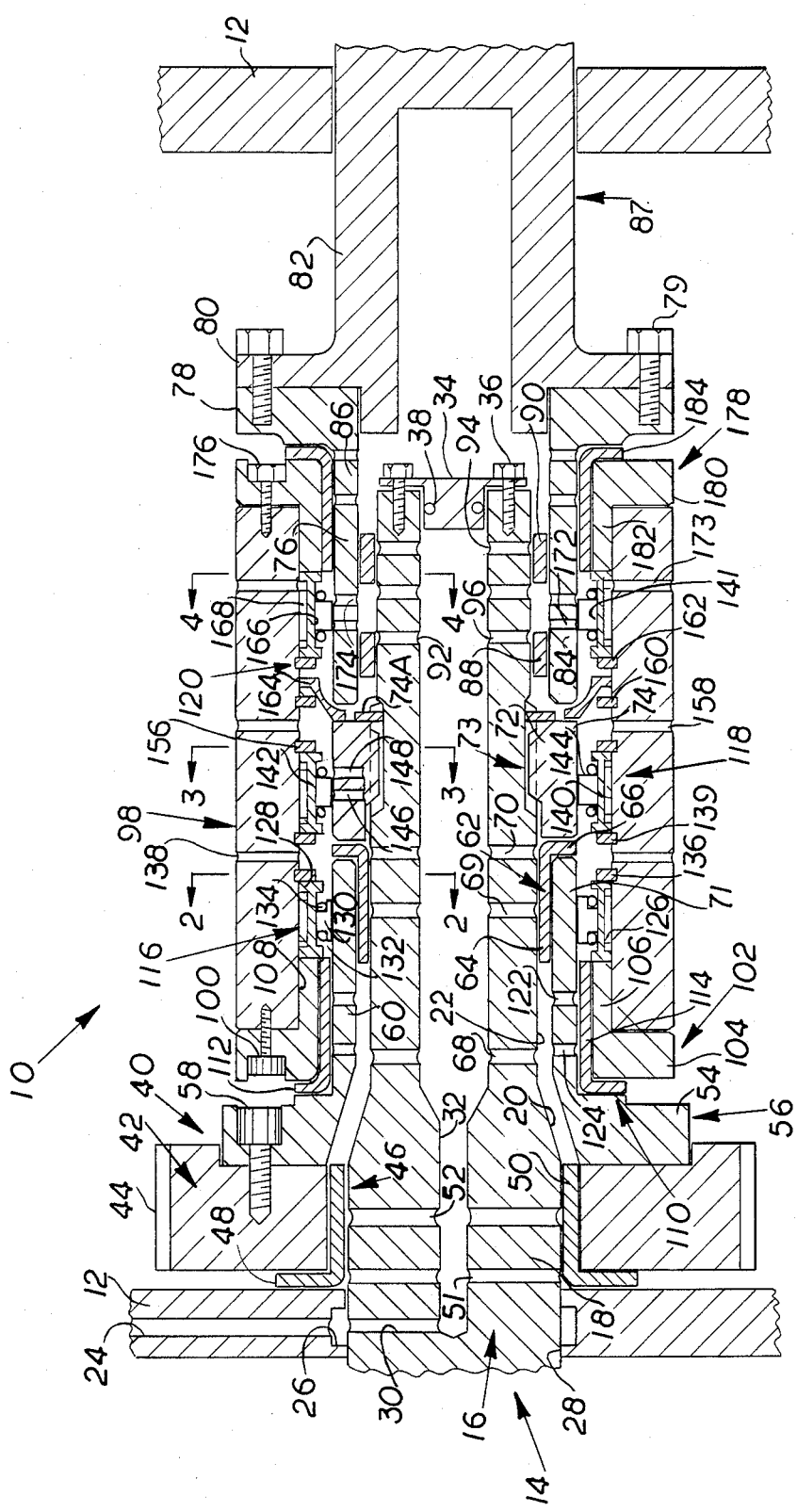
FIG. 1 is a longitudinal sectional view of a starter drive assembly embodying this invention.

Referring now to the drawings and more particularly to FIG. 1, a dual start drive system is shown generally at 10 and includes an enclosing housing shown fragmentarily at 12. Rotatably mounted in the left end wall of the housing 12 is a portion of the second speed drive number 14 in the form of a second speed drive shaft 16 which projects from the outside the left outer end of the housing 12 and extends inwardly thereof. Suitable bearing means (not shown) are disposed between the shaft 16 and the housing 12. The shaft 16 extends to the left of the housing 12 where it is drivingly connected to the second speed starter drive device (not shown).

The first increment 18 of the shaft 16 within the housing 12 is cylindrical and of uniform diameter. To the right of the first increment 18 is a rightwardly and inwardly extending taper 20 leading to a cylindrical portion 22 which extends to the right from the taper 20 and will be described in more detail hereinafter. The left wall of the housing 12 has an oil passageway 24 formed therein leading to an annular groove 26 formed in the housing bore 28 which rotatably mounts the drive shaft 16. The passageway 24 is supplied by lubricating oil from a sump pump in the housing 12. The annular groove 26 is constantly confluent with a radially extending passageway 30 formed in the drive shaft 16, with the inner end of the passageway 30 being confluent with an axially extending bore 32 formed in the drive shaft 16. The right end of the bore 32 is sealed by an end cap 34 bolted to the right end of the shaft 16 by a plurality of bolts 36; the end cap having an "O-ring" 38 therein sealingly engaging the bore 32.

Rotatably mounted on the first increment 18 of the second speed drive shaft 16 is a portion of the first speed drive member 40 in the form of a drive gear 42 having peripheral teeth 44 adopted to be driven by the first speed driving source (not shown). The gear 42 has a flanged bushing 46, in the bore thereof; which bushing has a radially outwardly extending flange 48 which engages the left end wall of the housing 12 for low friction relative rotation. The bushing 46 has a cylindrical portion 50 pressed in the bore of the gear 42 and which bushing is rotatably mounted on the cylindrical surface of the first increment 18 of the shaft 16. A pair of lubricant passageways 51 and 52 extend radially in the shaft 16 and lubricate the junction of the bushing 46 with the shaft 16 and the housing 12.

Bolted to the right side of the drive gear 42 by a plurability of bolts 58, is a flanged left portion 54 of a hollow rightwardly extending cylindrical second portion, seen generally at 56, of the first speed drive memeber 40; the bolts being countersunk and of the "Allen" head type. The cylindrical portion 56 extends to the right from the flange 54 for approximately one-third the length of the cylindrical portion 22 of the shaft 16, and is shaped to conform to but be spaced from the adjoining periphery of the shaft 16, so that the right end of the second portion 56 is cylindrical as seen at 60.

Into the right end of the cylindrical portion 60 of the second portion 56 is pressed an anti-friction bushing 62 which has a cylindrical portion 64 pressed into the cylindrical portion 60 and a radially outwardly extending flange portion 66 at the right end thereof.

Immediately to the right of the end of the tapered portion 20 of the shaft 16 is a radially extending oil passage 68, while at the medial portion of the cylindrical portion 64 of the bushing 26 another radially extending oil passage 69 is formed in the shaft 16 and at the right end of the bushing 62 is yet another radially extending oil passage 70. The oil passages 51, 52, 68, 69 and 70 being confluent with the bore 32 of the shaft 16. The peripheral surface 71 adjacent the right end of the cylindrical portion 60 of the second portion 56 forms the inner race of the first speed over-running or sprag clutch, shown generally at 116, as hereinafter more fully described.

Immediately to the right of the flange portion 66 of bushing 62 is a cylindrical member 72 which is splined onto splines formed in the adjacent cylindrical periphery of the cylindrical portion 22 of the second speed shaft 16; such splined connection being shown at 73. A snap ring 74A secured in a peripheral groove in the second speed shaft 16 abuts the right side of the cylindrical member 72 and holds it firmly to the left against the bushing 62. The cylindrical perpheral surface 74 of the member 72 forms the inner race of the second speed over-running or sprag clutch shown generally at 118 for the second speed drive member 14.

Spaced to the right of the member 72 is a cylindrical member 76 which has an annular flange 78 formed on the right end thereof. Bolted to the flange 78 by a plurality of bolts 79 is an annular flange 80 of the cylindrical output shaft 82 which is rotatably mounted in the right side of the housing 12 by suitable antifriction means (not shown). The cylindrical periphery 84 of cylindrical member 76 adjacent the left end thereof forms the inner race of the output over-running or sprag clutch, shown generally at 120, for the output member 87; the output member 87 including the output shaft 82, flange 80, flange 78 and cylindrical member 76.

The peripheral surfaces (inner races) at 71, 74 and 84 are of equal radial distance from the central axis of the drive system 10.

There is a radial space between the cylindrical bore 86 of the cylindrical member 76 and the ajoining cylindrical surface 22 of the shaft 16 and an axially split bushing is pressed into the cylindrical bore 86, with the left portion 88 of the bushing being adjacent the left end of the cylindrical member 76 and the right portion 90 of the bushing being spaced to the right thereof. The bushings 88 and 90 engage the periphery 22 of the shaft 16 for low friction rotation. Formed in the shaft 16 are three more radially extending oil passages which are confluent with the bore 32 in the shaft 16; an oil passage 92 is formed beneath the left portion 88 of the bushing, an oil passage 94 is formed beneath the right portion 90 of the bushing, and an oil passage 96 is formed between the two bushings to provide a hydrodynamic film for the sprags of the output sprag clutch 120.

Overlying the peripheral surfaces 71, 74 and 84, which form the inner races of the sprag clutches, 116, 118 and 120 respectively, is an outer race 98 which is formed in one piece; it being understood that for the purpose of this invention the outer race could be formed in several pieces and then intimately secured for unitary movement.

The left end of the outer race 98 has secured thereto, as by a plurality of countersunk bolts 100 of the "Allen" head type, a flanged cylindrical insert 102. The flange 104 of the insert overlies the left end of the outer race 98 while a hollow cylindrical portion 106 of the insert extends into, in a snug fit relationship, the bore 108 of the outer race 98. The insert 102 is spaced from the flanged portion 54 and the cylindrical portion 60 of the cylindrical second portion 56 of the first speed drive member 40. A flanged bushing 110 is pressed into the left end of the flanged insert 102, with the radially extending flange 112 of the bushing 110 lying between the flanges 54 and 104 and the cylindrical portion 114 of the bushing 110 being pressed into the cylindrical portion 106 of the insert 102; the bore in the bushing 110 providing for low friction rotation between the insert 102 and portion 56. A pair of lubrication openings 122 and 124 are formed in the cylindrical portion 60 beneath the cylindrical portion 114 of the bushing 110 to allow lubricant to flow therebetween and lubricate the bushing 110.

Immediately to the right of the flanged insert 102 is the annular cage 126 of the first speed sprag clutch 116; the internal peripheral surface 128 portion of the bore 108 of the outer race 98 surrounding the cage 126 forming the first speed sprag engaging surface of the unitary outer race 98. The cage 116 has circumferentially spaced openings receiving and supporting a plurality of circumferentially spaced first speed sprags 130 in a conventional manner; the sprags 130 being supported by a pair of axially spaced annular coiled compression springs 132 and 134 conventionally received in lateral grooves in the sprags 130. Referring to FIGS. 1, 2 and 5, when the inner race 71 is driving in the direction of the arrow A in FIG. 2, the outer race 98 will be driven by the sprags 130 driving engagement with the first speed outer race 128 in the direction of the arrow B in FIG. 2. When the inner race 71 is stationary or moving slower then the outer race 98 the sprags 130 will allow the outer race to over-run the inner race 71. Further, since the first speed sprag clutch 116 is of the well known centrifugal throwout type, that is, the mass of the sprag 130 is located so that when the outer race is over-running, the centrifugal force of the sprags overcomes the energizing force of the coiled compression springs 132 and 134 causing the sprags to completely lift off of the inner race 71. The point at which the sprags lift off of the inner race is called the lift-off speed. The maximum drive speed is always less than the lift-off speed to insure positive sprag engagement when the outer race is not over-running the inner race. The primary advantage of the centrifugal sprag clutch is that when the sprags lift off the inner race there is no rubbing contact in the sprag clutch. Since the first speed sprag clutch 116 is intended to drive to about 100 r.p.m., a lift-off speed of about 300 r.p.m. has been found satisfactory for the dual start drive system 10 when the second speed drive will be up to about 3600 r.p.m., the later being the starting speed of the device to be started.

A snap ring 136 is disposed in a groove in the bore 108 of the outer race 98 immediately to the right of the cage 126 to confine the cage between the snap ring 136 and the right end of the cylindrical portion 106. Immediately to the right of the snap ring 136 is a plurality of circumferentially spaced oil drainage openings 138 which lead to the sump of the housing 12.

Immediately to the right of the openings 138 is a snap ring 139 received in an annular groove in the bore 108 of the outer race 98. The interal peripheral surface 140 to the right of the snap ring 139 forms the second speed sprag engaging surface of the outer race 98.

Referring to FIGS. 1, 3 and 6, abutting the right side of the snap ring 139 is the annular cage 142 of the second speed sprag clutch 118. The cage 142 has circumferentially spaced openings receving and supporting a plurality of circumferentially spaced second speed sprags 144 in a conventional manner, the sprags 144 being supported by a pair of axially spaced annular coiled compression springs 186 and 188 conventionally received in lateral grooves in the sprags 144, against the second speed outer race portion 140 of the outer race 98. Referring to FIG. 3, when the second speed inner race 74 is driving in the direction of the arrow C and the inner race 74 is rotating faster than inner race 71, the outer race 98 will be driven in the direction of the arrow D by the sprags 144 driving engagement with the second speed sprag engaging surface 140 of outer race 98 and the first speed outer race portion 128 with the sprags 130 will over-run the first speed inner race 71. The second speed sprag clutch 118 is of the continuous engagement type which is a conventional type of sprag clutch which provides slight sliding engagement of the sprags 144 with inner and outer races 74 and 140 respectively at such time as the outer race is over running the inner race. When the first speed clutch 116 is driving the outer race 98 and the latter is over-running the second speed inner race 74, there is no need for a centrifugal throwout sprag clutch to be used because the speed differential is so slight that a light oil film will provide adequate wear protection. This light oil film is provided by lubricant being supplied to the surface 74 by a plurality of circumferentially spaced radially extending openings 146 and 148 formed in the cylindrical member 72; lubricant reaching the latter openings through the spline connection 73 which receives lubricant from passages 70 and 92.

Immediately to the right of the cage 142, a snap ring 156 is disposed in a groove in the bore 108 of the outer race 98 to confine the cage between the snap rings 139 and 156. Immediately to the right of the snap ring 156 is an oil drainage passageway 158 which leads to the sump of the housing 12.

Immediately to the right of the passageway 158 are a pair of slightly spaced left and right snap rings 160 and 162 respectively which are disposed in registering grooves in the bore 108 of the outer race 98. Disposed between the snap rings 160 and 162 is the outer periphery of an annular ring 164 which is concave when viewed from the right; the central opening in the annular ring 164 being slightly spaced from the snap ring 74A and from the left end of the cylindrical member 76 to form a dam to inhibit the flow of lubricant to the left past the same.

Referring now to FIGS. 1 and 4, abutting the right side of the snap ring 162 is an annular cage 166 of the output sprag clutch 120. The cage 166 has a plurality of circumferentially spaced openings receiving and supporting a plurality of sprags 168 of the output sprag clutch 120 in a conventional manner. The clutch 120 has a pair of coiled compression springs, one of which being seen at 170, conventionally received in lateral grooves in the sprags 168, holding the outer periphery of the sprags 168 against the output outer race portion in the form of the internal peripheral surface 141 of the outer race 98. The output clutch 120 is a mirror image of the second speed clutch 118 as is readily apparent from viewing FIGS. 3 and 4. The obvious reason for this is that the outer race 98 drives the inner race 84 of the output clutch instead of as in the second speed clutch where the inner race drives the outer race. When the outer race 98 is being driven in the direction of the arrow E in FIG. 4 by either the first or the second speed clutch, the outer race 98 will drive the inner race 84 through the cams 168 in the direction of the arrow F.

Once the device to be started becomes started by the drive system 10, the second speed drive is discontinued, the started device will commence driving the output shaft 82 and the output shaft 82 will over-run the outer race 98, the output clutch 120 and both the first and second speed sprag clutches 116 and 118 respectively.

Lubrication openings 172 and 174 beneath the sprags 168 provide a hydrodynamic film and inhibit over-running wear between the sprags 168 and the inner race 84 of the output clutch 120. An oil drainage opening 173 is formed in the outer race 98 at the right side of the cage 166 and leads to the sump of the housing 12.

The right end of the outer race 98 has secured thereto, as by a plurality of countersunk bolts 176 of the "Allen" head type, a flanged cylindrical insert 178. The flange 180 of the insert overlies the right end of the outer race 98 while a hollow cyindrical portion 182 of the insert extends into, in a snug relationship, the bore 108 of the outer race 98. The insert 178 is spaced from the flange portion 78 and cylindrical portion of the cylindrical member 76. A flanged bushing 184 is pressed into the bore of the insert 178 and provides for low friction engagement between the cylindrical member 76 and the insert 178. The left end of the cylindrical portion 182 engages the right side of the cage 166 of the output sprag clutch 120 to assist in positioning the cage 166.

It should be understood that while the drive members of the over-running clutches 116, 118 and 120 have been referred to as sprags, these drive members may take the shape and nomenclature of other type of suitable one-way over-running clutch drive members.

It will thus be seen that the objects set forth above, and those made apparent from the forgoing description, are efficiently attained and since certain changes may be made in the above construction without departing from the scope of the invention, it is intended that all matters contained in the foregoing description or in the accompanying drawings shall be interpreted as illustrative and not in a limiting sense.

It is also understood that the following claims are intended to cover all the generic and specific features of the invention herein described, and all statements of the scope of the invention which, as a matter of language, might be said to fall therebetween.

Now that the invention has been described,
What is claimed is:

1. A dual start drive system for starting a rotating device comprising,
   a. a first input over-running clutch having an inner and an outer race,
   b. a second input over-running clutch having an inner and an outer race,
   c. an output over-running clutch having an inner and an outer race,
   d. a first drive member for driving said inner race of said first clutch,
   e. a second drive member for driving said inner race of said second clutch,
   f. a driven member for being driven by said inner race of said output clutch with said driven member being available for imparting starting rotational forces,
   g. separate one way drive means between said inner races and outer races of said first and second clutches for allowing said inner races to drive said outer races and for allowing said outer races to over-run said inner races,
   h. and one way drive means between said inner and outer races of said output clutch for allowing said outer output clutch race to drive said inner output clutch race and for allowing said inner output clutch race to over-run said outer output clutch race,
   i. said outer races of said first, second and output clutches being connected for unitary rotation.

2. A drive system according to claim 1 wherein said inner and outer races are coaxial.

3. A drive system according to claim 2 wherein said outer races are formed as a unitary one piece member which over lies all of said inner races.

4. A drive system according to claim 3 wherein
   a. said first clutch is adapted to be driven at a relatively low speed,
   b. said second clutch is adapted to be driven at a higher speed than said first clutch,
   c. said first drive member is hollow and terminates at its axially inner end with said first clutch,
   d. said second drive member extends through and rotatably mounts said first drive member thereon, and
   e. said second clutch is disposed on said second drive member and positioned axially intermediate said first clutch and said output clutch.

5. A drive system according to claim 4 wherein said first clutch and said first drive member are adapted to rotate at a slower speed than said second drive member and said first clutch is of the centrifugal throw-out type.

6. A drive system according to claim 4 wherein said second drive member extends to and rotatably mounts said output clutch and oil passage means in said second drive member are confluent with oil passage means in said output clutch for supplying a hydrodynamic film of oil between said drive means of said output clutch and the inner race of said output clutch.

7. A dual start drive system for starting a rotating device comprising
   a. a first speed input means,
   b. a second speed input means for driving at a higher speed of rotation than said first speed input means,
   c. an output means for alternately being driven by said first speed input means and said second speed input means and also for over-running said first and said second speed input means,
   d. said first and said second input means and said output means being coaxial and each carrying an inner race of an over-running clutch thereon,
   e. a first speed, a second speed and an output means over-running clutch outer races, with said outer races being coaxial with each other and being axially aligned with said first speed, said second speed and said output means inner race respectively,
   f. said outer races being drivingly connected for unitary rotation, and
   g. over-running clutch driving means disposed between said inner and outer races with said driving means of said first and second speed clutches being adapted to drive from said inner race to said outer race when the respective inner race thereof is attempting to rotate faster than the outer race associated therewith and with said outer race of said driving means of said output clutch being adapted to drive said inner race of said output clutch when said output clutch outer race is attempting to rotate faster than said output clutch inner race and said output clutch inner race being adapted to over-run said output clutch outer race when said latter inner race is attempting to rotate faster than said latter outer race.

8. A drive system according to claim 7 wherein each of said over-running clutch outer races has an internal engaging surface with said engaging surfacse being at a uniform distance from the axis of said outer races and each of said inner race has an external engaging surface, said external engaging surfaces being at a uniform distance from the axis of said inner races.

9. A drive system according to claim 7 wherein said outer races are formed as a unitary one piece member which overlies all of said inner races.

10. A drive system according to claim 7 wherein said first speed input means is hollow and terminates at its axially inner end with said first speed inner race, said second speed input means extends axially through said first speed input means and rotatably mounts the latter thereon, said inner race of said second speed input means being disposed on said second input means and is positioned axially intermediate said first speed inner race and the inner race of said output mean.

11. A dual start drive system for starting a rotating device comprising,
   a. a first speed over-running clutch, a second speed over-running clutch and an output over-running clutch with said clutches being disposed coaxially,
   b. each of said clutches having an outer race with the outer races of said clutches being connected for unitary rotation,
   c. each of said clutches having an inner race,
   d. a first speed and second speed drive member and an output member with the inner race of said first speed clutch being drivingly connected to said first speed drive member, said inner race of said second speed clutch being drivingly connected to said second speed drive member and said inner race of said output clutch being drivingly connected to said output member,
   e. a plurality of first speed driving members disposed between said first speed inner and outer races for driving said first speed outer race from said first speed inner race by contacting both of said first speed races, f. a plurality of second speed driving members disposed between said second speed inner and outer races for driving said second speed outer race from said second speed inner race by contacting both of said second speed races when said first speed clutch over-runs, and a plurality of first speed driving members disposed between said first speed inner and outer races for driving said first speed outer race from said first speed inner race by contacting both said first speed races when said second speed clutch over-runs, g. a plurality of output driving members disposed between said output inner and outer races for driving said output inner race from output outer race when said output outer race is driving and for allowing said output inner race to over-run said output outer race when said output inner race is driving.

* * * * *